United States Patent
Tench et al.

(10) Patent No.: US 6,400,491 B1
(45) Date of Patent: Jun. 4, 2002

(54) FAST-SWITCHING REVERSIBLE ELECTROCHEMICAL MIRROR (REM)

(75) Inventors: D. Morgan Tench; Leslie F. Warren, Jr., both of Camarillo; Petra V. Rowell, Newbury Park, all of CA (US)

(73) Assignee: Innovative Technology Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 09/619,127

(22) Filed: Jul. 18, 2000

Related U.S. Application Data

(63) Continuation-in-part of application No. 09/356,730, filed on Jul. 19, 1999, now Pat. No. 6,111,685, which is a continuation-in-part of application No. 09/333,385, filed on Jun. 15, 1999, now Pat. No. 6,166,847, which is a continuation-in-part of application No. 08/994,412, filed on Dec. 19, 1997, now Pat. No. 5,923,456.

(51) Int. Cl.$^7$ .............................................. G02F 1/153
(52) U.S. Cl. ...................... 359/270; 359/267; 359/272; 359/274
(58) Field of Search ................... 359/265–275

(56) References Cited

U.S. PATENT DOCUMENTS

| | | | | |
|---|---|---|---|---|
| 5,239,405 A | * | 8/1993 | Lynam ........................ | 359/265 |
| 5,855,755 A | * | 1/1999 | Murphy et al. ............. | 205/122 |
| 5,923,456 A | * | 7/1999 | Tench et al. ................ | 359/266 |
| 5,948,232 A | * | 9/1999 | Murphy et al. ............. | 205/122 |
| 5,998,617 A | * | 12/1999 | Srinivasa et al. ........... | 544/347 |
| 6,020,987 A | * | 1/2000 | Baumann et al. ........... | 359/273 |
| 6,111,685 A | * | 8/2000 | Tench et al. ................ | 359/267 |
| 6,166,847 A | * | 12/2000 | Tench et al. ................ | 359/266 |
| 6,256,135 B1 | * | 7/2001 | Tench et al. ................ | 359/271 |
| 6,301,039 B1 | * | 10/2001 | Tench et al. ................ | 359/267 |

* cited by examiner

*Primary Examiner*—Ricky Mack
*Assistant Examiner*—Evelyn A. Lester
(74) *Attorney, Agent, or Firm*—John J. Deinken; D. M. Tench

(57) ABSTRACT

A reversible electrochemical mirror (REM) includes a first electrode and a second electrode, one of which is substantially transparent to at least a portion of the spectrum of electromagnetic radiation. An essentially nonaqueous electrolytic solution, disposed between the first and second electrodes, contains ions of an electrodepositable metal having a molar concentration of more than 0.5 M. The electrolytic solution also contains halide and/or pseudohalide anions having a total molar concentration ratio of at least 2:1 relative to the concentration of the electrodepositable metal cations. A negative electrical potential applied to the first electrode causes deposited metal to be dissolved from the second electrode into the electrolytic solution and to be electrodeposited from the solution onto the first electrode to form a mirror deposit, thereby affecting the reflectivity of the REM device for electromagnetic radiation. A positive electrical potential applied to the first electrode causes deposited metal to be dissolved from the first electrode into the solution and electrodeposited from the solution onto the second electrode, thereby decreasing the reflectivity of the REM mirror. It is usually necessary to apply a surface modification layer to the first electrode to ensure uniform nucleation so that a mirror electrodeposit having high reflectivity is obtained. The high molar concentration of mirror metal cations attained in essentially nonaqueous solvents by use of at least a 2:1 molar ratio of halide and/or pseudohalide anions to electrodepositable metal ions in the electrolyte provides the fast switching speed, inherent electrolyte stability, high deposit quality, good deposit erasure and long cycle life needed for practical applications. Increases above this 2:1 molar ratio may be required to optimize the device performance.

52 Claims, 5 Drawing Sheets

FAST-SWITCHING REVERSIBLE ELECTROCHEMICAL MIRROR (REM)

CROSS-REFERENCE TO RELATED APPLICATIONS

This application is a continuation-in-part of application Ser. No. 09/356,730, filed Jul. 19, 1999 (now U.S. Pat. No. 6,111,685), which is a continuation-in-part of application Ser. No. 09/333,385, filed Jun. 15, 1999 (now U.S. Pat. No. 6,166,847), which is a continuation-in-part of application Ser. No. 08/994,412, filed Dec. 19, 1997, which issued as U.S. Pat. No. 5,923,456 on Jul. 13, 1999.

BACKGROUND OF THE INVENTION

1. Field of the Invention

This invention is concerned with devices, such as mirrors and windows, having controllable reflectivity.

2. Description of the Related Art

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage smart window with variable reflectivity. Reflecting the light, rather than absorbing it, is the most efficient means for avoiding inside heating. Devices for effectively controlling transmission of light are also needed for a variety of other applications, e.g., energy efficient dimmers for displays.

Bright light from headlamps on following vehicles reflected in automobile rear and side view mirrors is annoying to drivers and creates a safety hazard by impairing driver vision. Currently available automatically dimming mirrors rely on electrochromic reactions to produce electrolyte species that absorb light that would otherwise be reflected from a static mirror. Such devices do not provide close control over the amount of reflected light, and are expensive to fabricate since a very constant inter-electrode spacing is required to provide uniform dimming. Image sharpness is also reduced for electrochromic mirror devices since the reflected light must pass through the electrolyte (twice). There is an important need for an inexpensive adjustable mirror device that provides close control of reflected light with minimal image distortion.

In prior art attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of metal deposition at the counter electrode). In general, the prior art literature teaches that an auxiliary counter electrode reaction is required for transmission-type devices to avoid metal electrodeposition at the counter electrode as metal electrodissolution occurs at the working electrode, which would produce no net change in transmission. Such teachings imply that the application of reversible metal deposition to smart windows must involve light absorption by the finely divided electrodeposited metal, which would result in heating of the device itself and thus the space inside. The low reflectance of this type of deposit would not be appropriate for adjustable mirror applications.

Electrolytes described in the prior art literature contain auxiliary redox species (e.g., bromide, iodide, or chloride) that are oxidized (e.g., to bromine, iodine, or chlorine) at the counter electrode during metal deposition under the high drive voltages used. This introduces chemistry-related instabilities during long term operation and leads to deposit self erasure on open circuit via chemical dissolution of the metal deposit, e.g., $2Ag^0 + Br_2 \rightarrow 2AgBr$. In most cases, this auxiliary redox process hinders metal deposition at the counter electrode during erasure, introducing a threshold voltage that is desirable for display applications. This auxiliary redox process may represent a significant side reaction even when metal electrodeposition/dissolution occurs at the counter electrode and a threshold voltage is not observed. See, e.g., Warszawski, columns 3–4 (when copper or nickel were present in the counter electrode paste) and Duchene et al., Electrolytic Display, IEEE Transactions on Electron Devices, Volume ED-26, Number 8, Pages 1243–1245 (August 1979); French Patent No. 2,504,290 (Oct. 22, 1982). High switching voltages of at least 1 V were used for all the electrodeposition devices which have been found in the patent and literature prior art.

A paper by Ziegler et al. (Electrochem. Soc. Proc. Vol. 93–26, p. 353, 1993) describes an investigation for display applications of the reversible electrodeposition of bismuth in aqueous solutions containing a large molar concentration ratio of halide anions to the trivalent bismuth ion. Halide anion oxidation served as the counter electrode reaction with the 1.5 V write voltage used. The deposits obtained were dark in color and were shown to decrease the reflectance of the ITO surface. Subsequent reports by these authors (Electrochem. Soc. Proc. Vol. 94–31 (1994), p. 23; Solar Energy Mater. Solar Cells 39 (1995), p. 317) indicated that addition of copper ions to the electrolyte was necessary to attain complete deposit erasure. These authors also utilized a counter electrode reaction other than metal electrodeposition/dissolution, and also never obtained a mirror deposit. Thus, Ziegler et al. provide no teachings relevant to the effect of electrolyte composition on the deposition/dissolution rate and quality of mirror electrodeposits.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

One effort to improve the deposit quality of the electrolytic solution used in a reversible electrodeposition process, described in U.S. Pat. No. 5,764,401 to Udaka et al., requires the addition of organic additives to the solution. Unfortunately, such additives are typically destroyed during the electrodeposition process, greatly limiting cycle life. Furthermore, this approach fails to produce highly-reflectivemirror-like deposits that are required for adjustable mirror applications and provide the superior heat rejection needed for smart windows.

U.S. Pat. No. 5,880,872 to Udaka teaches that the "working" electrode of a reversible electrodeposition structure is degraded, and its working life thereby shortened, by the high voltage required to dissolve the metal film deposited upon it. Udaka states that this consequence can be avoided by adding an alkali metal halide to the device's electrolytic solution, preferably in an amount which provides an alkali metal halide to silver halide ratio of between 0.5 to 5. However, the described electrolytic formulation fails to provide the inherent stability, high quality deposits, good erasure and long cycle life needed for practical applications. Mirror deposits were never obtained.

Prior art literature teaches that the memory effect is temporary. This is a consequence of the occurrence of a counter electrode reaction other than metal electrodeposition/dissolution. The energetic oxidation products generated at the counter electrode can cause dissolution of the metal deposit on the working electrode either chemically on open circuit (slow) or electrochemically during short circuit (fast).

Nishikitani et al. (European Patent No. 0,618,477) teaches that the counter electrode in electrochromic devices for smart window applications can be a metal grid which is substantially transparent. Since no metal electrodeposition occurs in electrochromic devices, however, the grid in this case is used to provide a transparent electrode, not to maintain transparency by localizing metal deposition. In addition, to provide adequate electrical capacity for electrochromic devices, Nishikitani's grid would need a very high surface area (at least 10 $m^2/g$ and preferably 50 to 5,000 $m^2/g$) and a line width of 50 to 5,000 $\mu m$; alternatively, a plurality of dots on a conducting substrate can be used, but the dots must contain fine particles having electrical capacitance of not less than 1 farad/g.

In describing his concept for a reversible electrodeposition light modulation device, Zaromb (S. Zaromb, J. Electrochem. Soc. 109, p. 903, 1962) recognized that the concentration of the electrodeposited metal should be as high as possible to permit fast electrodeposition without excessive metal ion depletion at the electrode, but sufficiently below the solubility limit to avoid precipitation during rapid electrodissolution of the metal deposit. For his devices, involving electrodeposition of dark silver deposits, this worker recommended an aqueous electrolyte containing AgI at a molar concentration in the range of 3 to 3.5 M (solubility limit 4 M), and addition of 7 M NaI to enhance the electrolyte conductivity.

Nonetheless, relatively low concentrations of electrodeposited metal ions have been used in subsequent work on reversible electrodeposition light modulation devices employing nonaqueous solvents. This is not surprising since it is commonly recognized by those skilled in the art that such ionic salts tend to be much less soluble in nonaqueous solvents, which typically have lower dielectric constants than water. In addition, high concentrations of ionic salts in nonaqueous solvents would be expected to result in significant ion pairing, which can lower the electrolyte conductivity and reduce the rate at which high quality deposits can be electrodeposited. U.S. Pat. No. 5,880,872 to Udaka claims use of excess halide added as Li, Na or K salts (from 0.5 to 5 times the concentration of the silver halide) to support dissolution of silver halide for optical devices, but describes dissolution of only 0.5 M AgBr in nonaqueous dimethylsulfoxide(DMSO) solvent. Likewise, U.S. Pat. Nos. 5,764,401 and 5,864,420 to Udaka et al. describe use of only 0.5 M AgI or AgBr in DMSO and dimethylformamide (DMF) solvents. For the Udaka devices, even a potential of 1 V provided only about 1 $mA/cm^2$ of current. None of the Udaka electrolyte formulations yielded mirror deposits, good electrolyte stability, or devices with long cycle life.

SUMMARY OF THE INVENTION

The reversible electrochemical mirror (REM) device of this invention permits efficient and precise control over the reflection/transmission of visible light and other electromagnetic radiation. The mirror device includes a first electrode (or working electrode), on which a mirror deposit is reversibly electrodeposited and electrodissolved, and a second electrode (or counter electrode) at which occurs the reverse of the metal electrodeposition/dissolution process occurring at the first electrode. At least one of the electrodes (and its substrate) is substantially transparent to at least a portion of the spectrum of electromagnetic radiation. Typically, the transparent electrode is indium tin oxide (ITO) or fluorine doped tin oxide (FTO) deposited on a transparent glass (or plastic) pane which serves as the substrate. An electrolytic solution is disposed between the first and second electrodes such that ions of a metal which can electrodeposit on these electrodes are soluble in the electrolytic solution. The electrolytic solution described herein provides the inherent stability, high deposit quality, complete deposit erasure, long cycle life and fast switching needed for most practical applications.

When a negative electrical potential is applied to the first electrode relative to the second electrode, the applied potential causes deposited metal to be dissolved from the second electrode into the electrolytic solution and to be electrodeposited from the solution onto the first electrode as a mirror deposit, thereby affecting the reflectance of the REM device. An electrochemically stable surface modification layer deposited on the first electrode is usually required to facilitate substantially uniform nucleation of the electrodeposited metal in order to form a mirror deposit on the first electrode, such that the amount of deposited metal subsisting on the first electrode affects the reflectivity of the mirror for the radiation. The reflectivity of this mirror deposit can be selectively adjusted from near 0% to almost 100%, depending on the amount of metal deposited on the conducting film. Conversely, when the polarity is reversed and a positive electrical potential is applied to the first electrode relative to the second electrode, the applied potential causes deposited metal to be dissolved from the first electrode and electrodeposited from the solution onto the second electrode, thereby reducing the reflectivity of the mirror.

In various embodiments, at least one of the electrodes and its substrate, are substantially transparent to at least a portion of the spectrum of electromagnetic radiation. For an adjustable reflectivity device, such as an automatically dimmable mirror, either the first electrode and substrate are made transparent to enable adjustable reflectivity of light entering the device through the first electrode/substrate pane, or the second electrode and substrate are made transparent so that the radiation passes through the electrolyte to the mirror formed on the first electrode. The locally distributed electrode described in U.S. Pat. No. 5,903,382 to Tench et al., which is assigned to the same assignee as the present application, may be used to render the second electrode substantially transparent. For a device involving adjustable transmittance, such as a smart window, both electrodes are made substantially transparent to the radiation, as described in U.S. Pat. No. 5,923,456 to Tench et al., also assigned to the same assignee as the present application.

The first electrode and the surface modification layer may be disposed uniformly on a first substrate, or may be disposed in a pattern. The surface modification layer may be a thin layer (i.e., sufficiently thin to be nominally transparent) of an inert metal which is electrochemically more stable with respect to oxidation than the electrodeposited metal. An underlayer may be added between the first electrode and the surface modification layer to improve adhesion.

The electrolytic solution of this invention provides fast mirror switching with outstanding electrolyte stability, deposit quality, deposit erasure, current-voltage behavior, and cycle life performance. The solution contains an essentially nonaqueous solvent, electrodepositable mirror metal cations, e.g., $Ag^+$ ions, at a molar concentration of more than 0.5 M, and approximately twice this molar concentration or more of halide and/or pseudohalide anions. High solubility for the mirror metal cations can only be attained in the presence of such an excess of halide/pseudohalide anions, which are added to the electrolyte as salts of electrochemically unreactive cations, e.g., $Na^+$ or $Li^+$ ions. A halide/pseudohalide to mirror metal cation concentration ratio of significantly more than 2:1 may be used to optimize the switching speed, mirror deposit characteristics and cycle performance. In some cases, appreciable amounts of water might be added to the electrolyte to suppress the freezing point of the electrolyte, for example, without significantly affecting the device performance. The electrolytic solution may include a gelling agent to form an essentially nonaqueous gel electrolyte, as well as dissolved or suspended materials to enhance light absorption (e.g., to provide a black background) or reflection (e.g., to provide a white background), impart color, and/or provide additional electrolyte stability.

Further features and advantages of the invention will be apparent to those skilled in the art from the following detailed description, taken together with the accompanying drawings.

DETAILED DESCRIPTION OF THE INVENTION

Figure 1:
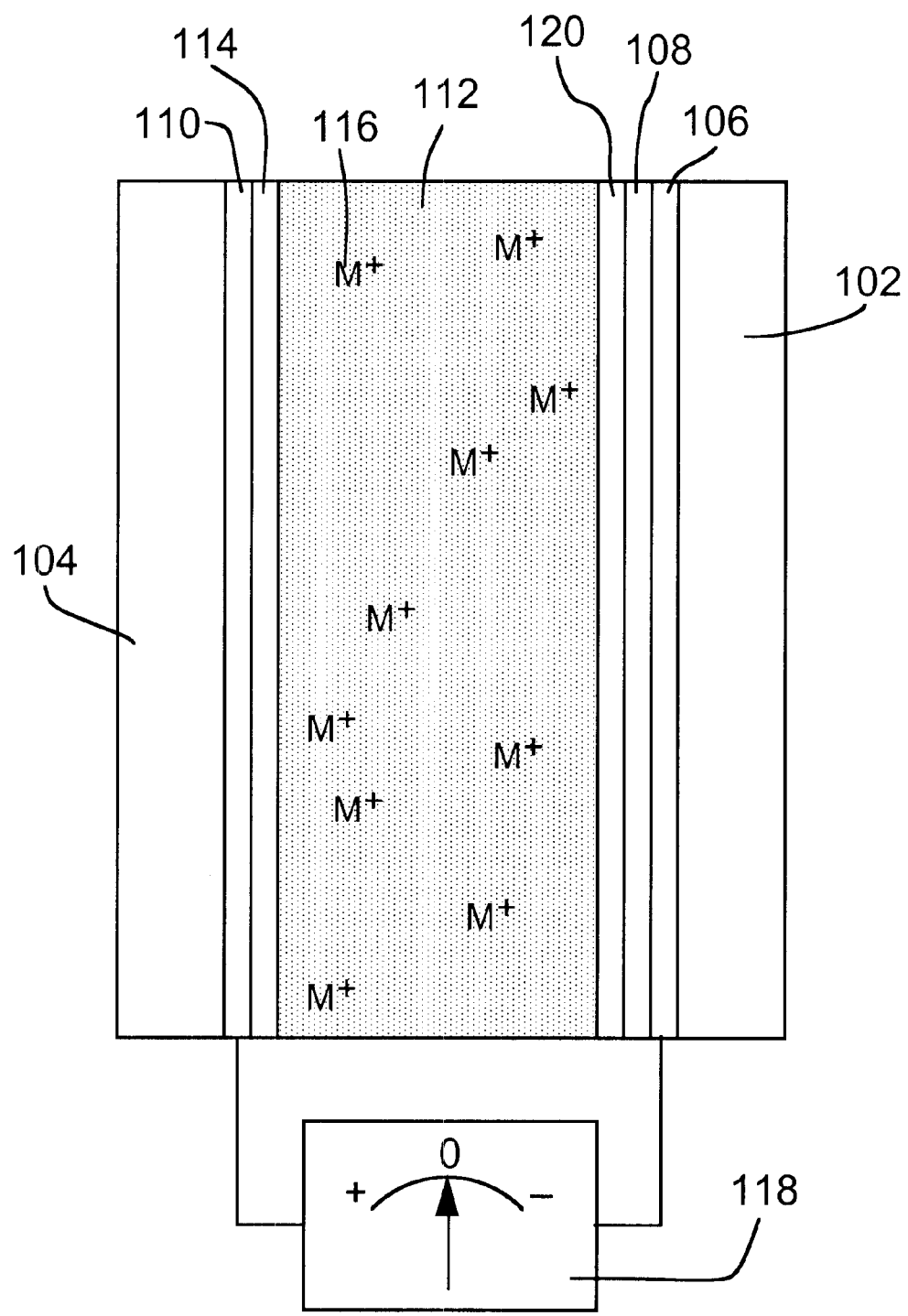
FIG. 1 is a cross sectional view depicting a representative design of a reversible electrochemical mirror (REM) device constructed according to the invention.

FIG. 1 is a cross sectional view depicting a representative design of a reversible electrochemical mirror (REM) constructed according to our invention (some dimensions, particularly layer thicknesses, are disproportionate in the drawings in order to more effectively illustrate the structure and function of the invention). The REM device in this example, which allows precise, reversible control over the reflection of electromagnetic radiation, includes a first substrate 102, which is substantially transparent to the portion of the spectrum of electromagnetic radiation which is to be controlled, and a second substrate 104. An electrically conducting film 106, which is also substantially transparent, is deposited on the first substrate. The film 106, with the optional addition of an electrochemically stable surface modification layer 108, functions as a first electrode. A second electrode 110 is deposited on the second substrate 104. The second electrode can alternatively be a bulk electrode, a metal plate or sheet for example, with sufficient rigidity that the second substrate 104 would not be needed. The second electrode 110 is electrochemically stable or is covered with a sufficient thickness of an active metal layer 114 to avoid exposure of the second electrode surface to the electrolyte. It may also be protected from exposure to the electrolyte by a coating of electrochemically stable metal. Relatively stable metals that might be used as the second electrode material or as a protective layer or coating on the second electrode include Pt, Ir, Au, Os, Pd, Re, Rh, Ru, Cr, Ni, Ti and stainless steel. The surface of electrode 110 may be roughened to reduce reflection of radiation from the electrode or to improve switching speed by lowering the current density (via increased surface area).

An electrolytic solution 112 is located between and in electrical contact with the electrodes 106 and 110. Solution 112 contains an essentially nonaqueous solvent, electrodepositable mirror metal cations 116 having a molar concentration greater than 0.5 M, and approximately twice this concentration of halide and/or pseudohalide anions. Higher concentrations of such anions may be used to optimize the mirror quality, and the device current-voltage characteristics and cycle life. In the configuration depicted in FIG. 1, the REM cell may be initially charged by depositing the metallic layer 114 on the electrode 110, i.e., the layer 114 is deposited on the electrode 110 prior to assembly of the REM cell. As those skilled in the art will appreciate, and as further explained in the discussion below regarding the operation of the REM device, such a metallic layer may, alternatively, be initially deposited on the electrode 110, on the electrode 106 (i.e., on the surface modification layer 108 as a layer 120), or, as depicted in FIG. 1, divided between a partial deposit on the electrode 106 and a partial deposit on the electrode 110. If the electrode 110 is not itself composed of the mirror metal, the amount of metal in these initially deposited layers constitutes the maximum amount of metal which will be available for deposit, as explained in more detail below, to control the reflectivity of the REM device. Metal ions 116, which contain the same metal atoms as the layers 114 and 120, are dissolved within the electrolytic solution 112 such that the metal atoms can be reversibly electrodeposited on and electrodissolved from the first and second electrodes. The surface modification layer 108 applied to the first electrode 106 facilitates the nucleation on this electrode of electrodeposited metal from the ions 116 to form a mirror deposit that highly reflects electromagnetic radiation.

The REM device is intended for use in conjunction with a source of electrical potential 118, which has a reversible polarity and adjustable or pre-set positive and negative potential values, connected between the first and second electrodes 106 and 110. When a negative electrical potential is applied to the first electrode 106 relative to the second electrode 110, metal 114 deposited on the second electrode 110 is dissolved from the second electrode into the electrolytic solution 112, while metal ions 116 in the solution are electrodeposited from the solution onto the surface modification layer 108 of the first electrode 106. The surface modification layer 108 causes the metal to deposit in a substantially uniform layer, forming a mirror surface.

When the polarity of the applied potential is reversed, such that a positive potential is applied to the first electrode 106 relative to the second electrode 110, deposited metal is dissolved from the first electrode into the solution 112 and dissolved metal is electrodeposited from the solution onto the second electrode.

The amount of deposited metal which remains on the first electrode determines the reflectivity which the mirror exhibits for radiation. The process is reversible, and the mirror may be maintained at virtually any point between substantially complete deposition on and substantially complete erasure from the first electrode 106 without additional current being required. Thus the REM mirror may be adjusted to any reflective value from approximately 0% reflective to approximately 100% reflective. The lower limit of reflectivity for the REM device is affected by the reflectivities of the nucleation layer 108, the electrode 106, and the substrate 102; these reflectivities may be reduced by use of anti-reflection coatings of the type commonly employed, or by adjusting the layer thicknesses. Likewise, the maximum reflectivity of the REM device is affected by light absorption in the substrate 102, the electrode 106, and the nucleation layer 108.

Figure 2:
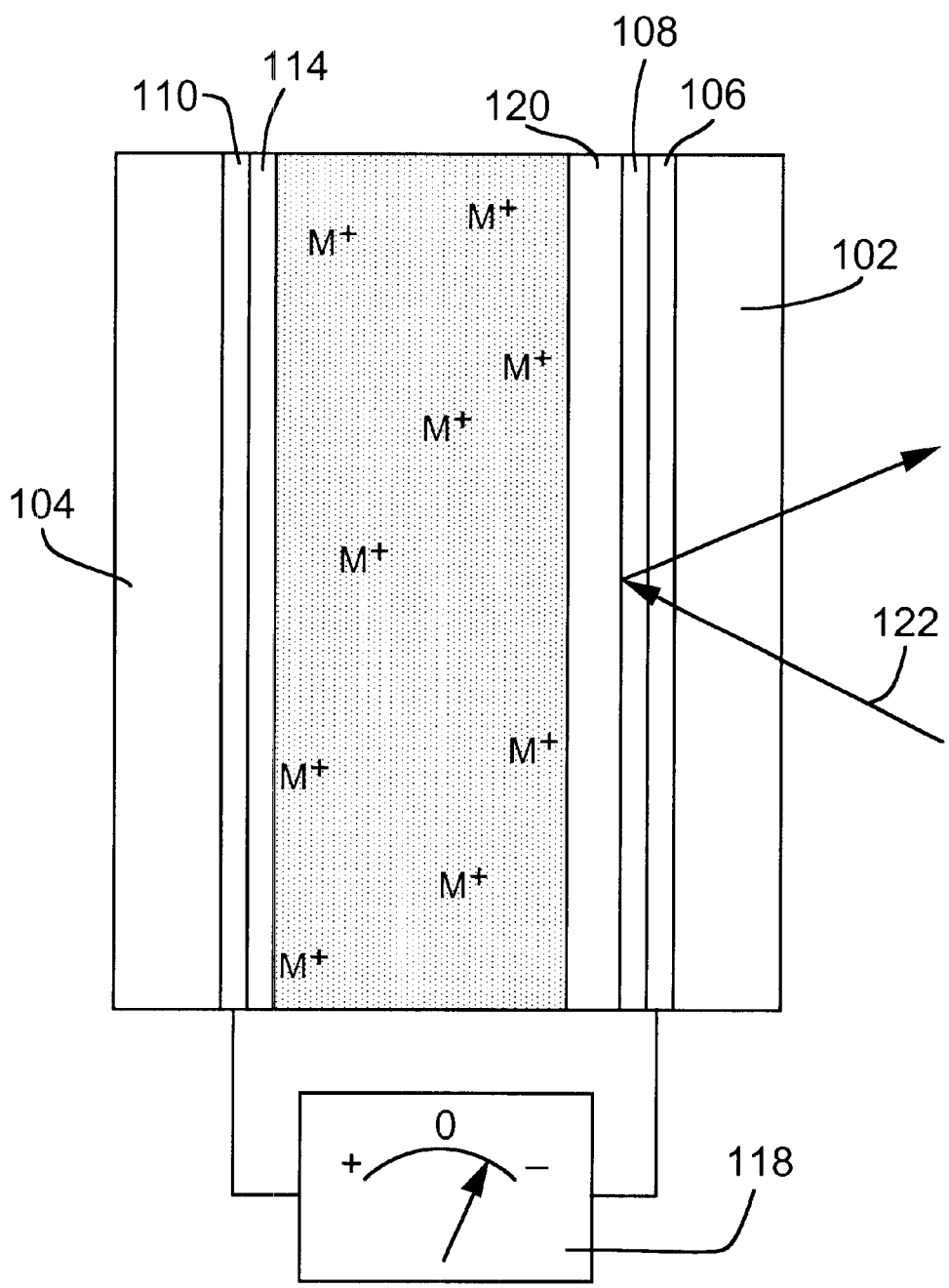
FIG. 2 is a cross sectional view similar to FIG. 1, but illustrating the configuration of the REM device when sufficient negative electrical potential has been applied to the first electrode relative to the second electrode to cause substantial quantities of the metal to deposit onto the first electrode.

FIG. 2 is a cross sectional view similar to FIG. 1, but illustrating the performance of the REM device when sufficient negative electrical potential has been applied to the first electrode relative to the second electrode for a sufficient period of time to cause a substantial layer of the metal to deposit onto the first electrode. In this condition, the layer 120, created by the deposited metal, functions as a highly reflective mirror and tends to reflect radiation, illustrated by the light beam 122, which impinges on the mirror.

Figure 3:
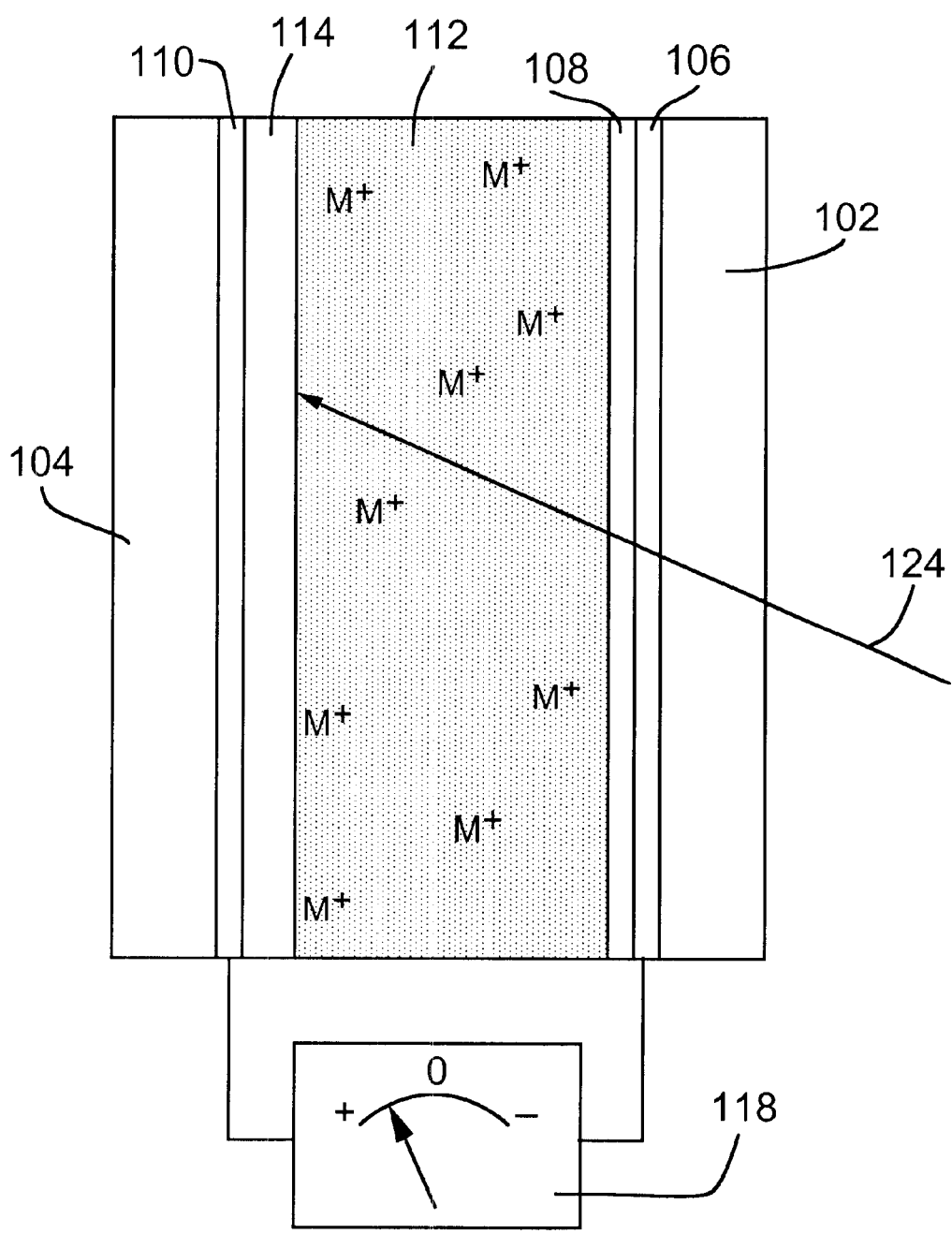
FIG. 3 is a cross sectional view similar to FIGS. 1 and 2, but depicting the status of the REM device when sufficient positive electrical potential has been applied to the first electrode relative to the second electrode to cause substantially all of the metal to deposit on the second electrode.

FIG. 3 is a cross sectional view similar to FIGS. 1 and 2, but illustrating the behavior of the REM device when sufficient positive electrical potential has been applied to the first electrode relative to the second electrode for a sufficient period of time to cause substantially all of the electroactive metal to dissolve from the first electrode and to deposit as part of the metallic layer 114 on the second electrode. In this condition, the REM mirror imposes a minimal impediment to incoming radiation, thereby allowing substantially all such incoming radiation of at least some wavelengths to be transmitted through the first electrode 106 and surface modification layer 108 and to then be absorbed or dispersed by the electrolyte 112 or by the deposited metal 114 on the second electrode 110, as illustrated by the light beam 124. Alternatively, the transmitted light might be absorbed or dispersed by a gel matrix if a gelled electrolyte is employed. An absorbing dye or pigment might also be added to the electrolyte to enhance light absorption. The second electrode 110 could also be a locally distributed electrode on a transparent substrate so that most of the radiation would pass through the device. For the configuration depicted in FIG. 3, the amount of reflected light is minimal.

In an alternative configuration, the first electrode can be disposed on a substrate that may be non-transparent, with the second electrode being essentially transparent and locally distributed on a transparent second substrate. In this variable reflectivity device, light entering through the second electrode and through the electrolyte can be reflected to varying degrees by the extent of mirror formation on the first electrode. The locally distributed electrode is described in U.S. Pat. No. 5,923,456 to Tench et al. and assigned to the same assignee as the present application.

The electrolytic solution 112 includes the following components:

1) an essentially nonaqueous solvent. The solvent is preferably selected from the following group: gamma-butyrolactone (GBL), ethylene glycol (EG), dimethylsulfoxide (DMSO), dimethylformamide(DMF), and mixtures of these solvents. The electrolyte may contain appreciable amounts of water as an impurity or added to alter a property, e.g., the electrolyte freezing point, not directly related to the enhanced mirror metal solubility and improved cycle performance of the present invention.

2) cations of at least one electrodepositable mirror metal having a molar concentration of more than 0.5 M. The electrodepositable metals are preferably selected from the following group: silver, bismuth, copper, tin, cadmium, mercury, indium, lead, antimony, thallium and zinc.

3) halide or pseudohalide anions having a combined molar concentration of at least twice that of the electrodepositable mirror metal cations. Excess halide/pseudohalide anions are added as compounds having a cation that is not electroactive in the voltage range over which the REM device is operated. Preferred non-electroactive cations include $Li^+$, $Na^+$, $H^+$ and organoammonium (e.g., alkylammonium or arylammonium) ions, but cations of magnesium, calcium, potassium, rubidium, cesium, strontium or barium might also be used. Preferably, the excess halide/pseudohalide anion concentration is adjusted to provide the optimum currents for electrodeposition and electrodissolution of the mirror metal at the anticipated operating voltages (typically the maximum negative and positive voltages for which electrochemical processes other than deposition/dissolution of the mirror metal do not occur). The mirror metal may be an alloy comprised of more than one metallic element.

In some embodiments of the invention, the electrolytic solution 112 includes the following additional components:

4) one or more stiffening agents to significantly increase the electrolyte viscosity and/or impede electrolyte flow, forming a viscous liquid, semi-solid or solid electrolyte. Dispersed inorganic materials, e.g., silica or alumina, have minimal effect on the electrolyte conductivity, are typically electrochemically inert in the voltage ranges of interest for REM devices, and form thixotropic gels that can be liquefied by mechanical shearing for facile injection in REM cells. Such gels are also relatively stable with temperature and adhere well to REM electrode materials. Other possible REM electrolyte stiffeners include organic gelling agents, e.g., polyacrylonitrile (PAN), polyvinylalcohol (PVA), polyvinylacetate (PVOAc), and polymethylmethacrylate (PMMA), which dissolve in liquid electrolytes to form plastic-like gels at ambient temperatures. The specific organic polymer gelling agent is chosen based on gel stability and chemical and electrochemical compatibility with a given electrolyte and the metal mirror formation/erasure processes. Porous solid polymers that absorb large quantities of electrolyte, e.g., ormasils and porous polypropylene, might also be used. In some cases, the solid polymer matrix may be formed by in situ polymerization of monomers dissolved in the electrolyte.

5) one or more coloring agents to impart a desirable color to the electrolyte, or absorb light strongly over the wavelength region of interest to avoid reflection from the counter electrode in reflectance-type devices. A black color can be imparted via addition of a small amount of dispersed carbon black, which is typically used in conjunction with an electrolyte stiffener to prevent settling under the influence of gravity. Different colors can be imparted by addition of one or more inorganic or organic materials, especially dye compounds, which must be selected to be compatible with other electrolyte components and to be electrochemically unreactive in the REM voltage operating range.

The use of a high concentration of mirror metal cations with halide/pseudohalide anions in an essentially nonaqueous solvent as specified herein increases the switching speed of REM devices by increasing the maximum metal electrodeposition current that can be sustained without excessive depletion of mirror metal cations at the electrode, which would degrade the quality of the mirror deposit and the cycle life of the device. High currents for electrodissolution of the mirror metal deposit can also be sustained if the concentration of the mirror metal cations is sufficiently below the solubility limit. Although unexpected from the prior art, we have discovered that very high concentrations of silver cations (more than 2 M) can be dissolved in nonaqueous solvents in the presence of halide and/or pseudohalide anions at twice the molar concentration of the silver cations. Furthermore, at least for some systems, an optimum ratio of halide anions to mirror metal cations exists, which provides high sustainable currents and more consistent current-voltage behavior for mirror metal electrodeposition and electrodissolution.

Figure 4:
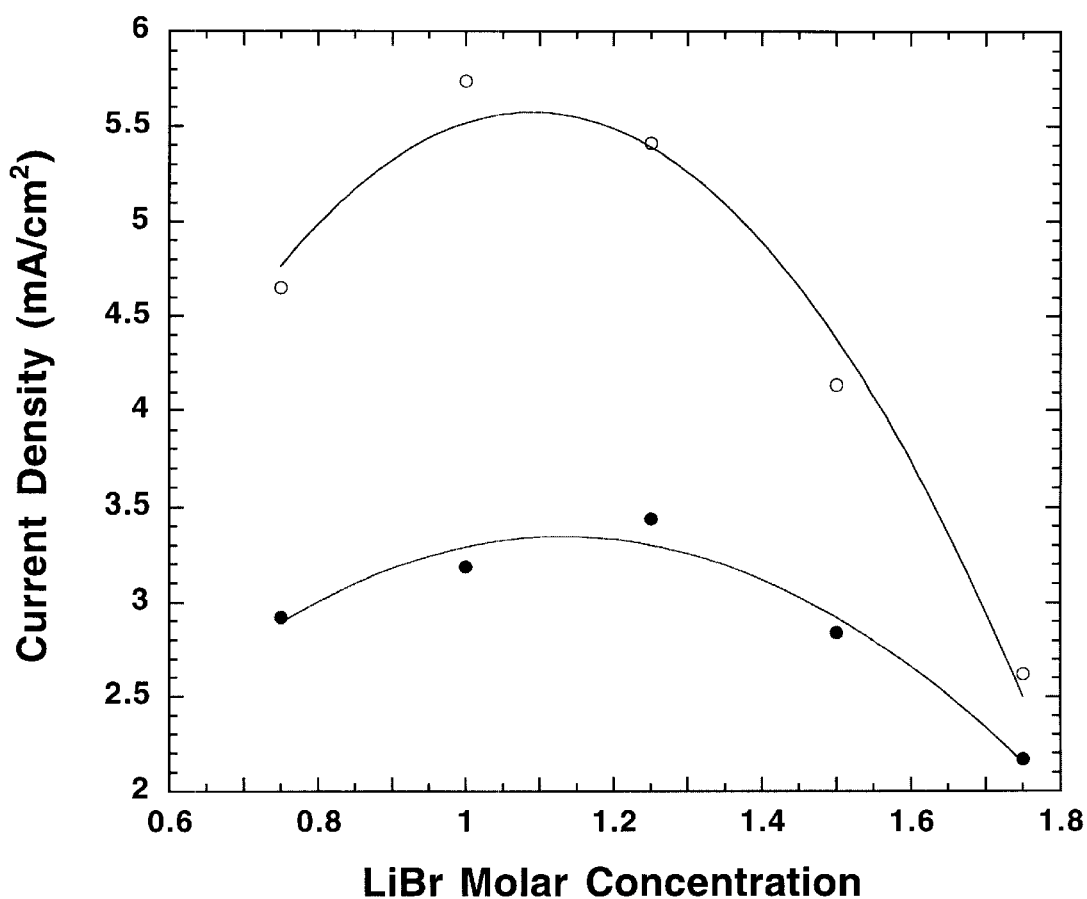
FIG. 4 gives plots of the silver electrodeposition and electrodissolution currents at ±0.25 V taken from voltammograms at 50 mV/s on a Pt electrode in gamma-butyrolactone (GBL) electrolytes containing 1.0 M AgI and various concentrations of LiBr.

FIG. 4 shows that both the electrodeposition and electrodissolution currents at ±0.25 V for a 1.0 M AgI solution in gamma-butyrolactone (GBL) solvent go through maximum values during potential scanning at 50 mV/s of about 3.3 and 5.5 mA/cm$^2$, respectively, for approximately 1.3 M LiBr in the electrolyte. Such high currents at such low voltages for reversible electrodeposition systems are unprecedented. However, high current capability is not the only consideration for REM electrolytes. In particular, it is highly advantageous that the currents do not decrease appreciably during times required for electrodeposition/dissolution of mirror deposits and that they change monotonically with applied voltage, which greatly simplifies precise control of the device reflectance. In addition, electrolyte compositions providing the highest currents may not provide the best, or even acceptable, mirror deposits and/or device cycle life.

Figure 5:
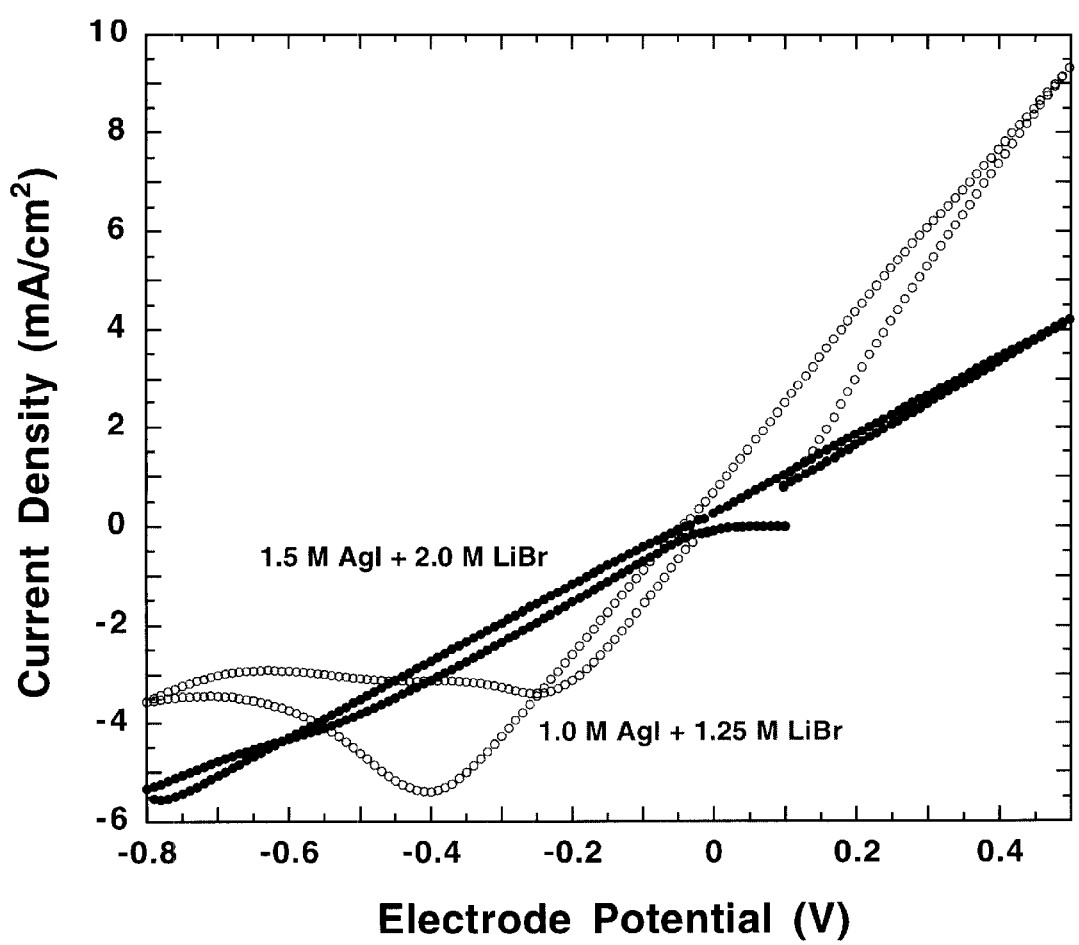
FIG. 5 compares voltammograms for a Pt electrode at 50 mV/s in two GBL electrolytes containing: 1.0 M AgI+1.25 M LiBr; and 1.5 M AgI+2.0 M LiBr.

FIG. 5 shows that a higher concentration of AgI (1.5 M compared to 1.0 M) at approximately the same LiBr/AgI ratio of 1.3 (halide/Ag$^+$ ratio of 2.3) gives much more advantageous current-voltage behavior. Although the currents at some voltages are higher for the lower AgI concentration, they vary in a complicated way with both voltage and time, as indicated by the overall curve shape and hysteresis for the anodic and cathodic sweeps. For the higher AgI concentration, on the other hand, the silver electrodeposition and electrodissolution currents are both high (4 mA/cm$^2$ at ±0.5 V) and sustained (very little hysteresis), and depend linearly with constant slope on the applied voltage. (Note that the small region of practically zero current between 0.1 and 0.0 V is an artifact of beginning the cathodic sweep at 0.1 V with no silver on the electrode.) Such linear current-voltage behavior greatly simplifies electronic control of the device reflectance, and suggests inherent kinetic limitations for the electrodeposition/electrodeposition processes that should be beneficial to mirror quality, uniformity and cycle life. The higher overvoltages tend to improve the deposit uniformity and mirror quality by increasing overall resistance to current flow (so that variations in electrolyte resistive paths are less important), and by inhibiting deposition at micro-peaks in the substrate that can result in runaway dendritic deposit growth associated with the higher electric field present at such peaks.

A REM device as described herein, employing an electrolyte having a concentration of mirror metal cations more than 0.5 M and halide/pseudohalideanion to active metal ion molar concentration ratio of at least 2:1 exhibited greater inherent electrolyte stability, enhanced mirror deposit quality, better erasure and longer cycle life when compared with devices using lower concentrations of mirror metal cations, or other substances, such as organic additives, in their electrolyte formulations. REM devices incorporating a GBL electrolyte formulated according to the present invention (1.5 M AgI+2.0 M LiBr) exhibited excellent mirror quality, uniformity and erasure characteristics, rapid switching and long cycle life. Dissolution of silver halides at concentrations of 2.0 M or more have been demonstrated via use of a 2:1 molar ratio of halides, according to the present invention, for gamma-butyrolactone (GBL), ethylene glycol (EG), dimethylsulfoxide (DMSO) and dimethylformamide (DMF) solvents.

Prior art efforts using lower concentrations of mirror metal cations, or which use complicated electrolyte formulations involving organic additives, have yielded devices that are incapable of producing mirror-like deposits and which suffer from other performance problems. The novel approach described herein avoids the complications inherent in other approaches, and enables the straightforward fabrication of practical and reliable REM devices with long cycle life.

Fabrication of a Preferred Embodiment

The preferred first electrode utilizes a glass or plastic substrate which is uniformly coated on one side with an optically transparent, low resistivity (about 10 Ω/square) ITO (indium tin oxide) or FTO (fluorine-doped tin oxide) film, which serves as the first electrode/current collector. An optically-thin adherent inert metal, such as Pt, is vapor deposited, preferably by sputtering, onto the ITO or FTO surface to enhance the uniformity of nucleation for metal deposition so as to provide a mirror deposit; other electrochemically inert metals can also be used, e.g., gold, palladium, rhodium, iridium, ruthenium, rhenium,etc. It may be advantageous in some cases to employ a duplex metal film, e.g., Ti/Au or Cr/Au, in which the very thin underlayer metal (e.g., Ti or Cr) serves to improve adhesion of the noble metal nucleation layer to the electrode. A nucleation layer is not necessary for some REM systems, notably aqueous silver cyanide electrolytes. An electrical bus connection is formed around the perimeter of the ITO or FTO coating.

For REM devices involving adjustable transmittance, the preferred second electrode is locally distributed, as described in U.S. Pat. No. 5,903,382 to Tench et al., which is assigned to the same assignee as the present application. In this case, the second electrode comprises an electrochemically inert metal grid or nucleation layer matrix pattern of relatively small overall area so that metal plated on the second electrode blocks only a small fraction of the radiation.

For adjustable reflectivity REM devices, the preferred second electrode comprises a reasonably thick (e.g., 1 $\mu$m) layer of mirror metal on an electrochemically stable conducting substrate, e.g., a 50 Å layer of Pt on an ITO/glass or plastic substrate, used in conjunction with a light-absorbing electrolyte to reduce reflection of radiation from the second electrode. When the second electrode is not electrochemically stable under the operating conditions, an excess amount of mirror metal must be used so that the second electrode is always covered with the mirror metal and is not exposed to the solution. Alternatively, a protective layer of an electrochemically inert metal, such as platinum, is used between the reactive substrate and the mirror metal. Prior to cell assembly, the second electrode, if other than the mirror metal, is plated with a quantity of mirror metal sufficient to provide the desired amount of reflectivity when deposited on the first electrode and to prevent exposure of the second electrode substrate metal to the electrolyte. Alternatively, the first electrode can be plated with this initial mirror metal charge.

The preferred electrolyte is both chemically and electrochemically stable except with regard to electrodeposition/dissolution of the mirror metal. Preferably, the mirror metal is silver added to the electrolyte as a silver halide (or pseudohalide) rendered stable and highly soluble in the electrolyte by addition of halide/pseudohalide anions derived, at least partially, from a compound(s) having a cation(s) that is not electroactive under the REM operating conditions (e.g., lithium or sodium). Maximum solubility is provided by a 2:1 molar concentration ratio of halide/pseudohalide anions to silver cations. Other mirror metals having relatively low toxicity and good electrochemical characteristics include copper, tin, and bismuth. A mixture of halide/pseudohalide ions (chloride, iodide, bromide, cyanide and thiocyanate) may be employed. The solvent is essentially nonaqueous and is chosen with respect to its freezing and boiling point to provide the desired temperature operating range, as well as good electrolyte stability and good mirror cycling characteristics. Preferred solvents include GBL, EG, DMSO, DMF, and mixtures of these. Appreciable amounts of water may be added to suppress the freezing temperature of some solvents, e.g., ethylene glycol. Solubility considerations may limit the acceptable combinations of mirror metal salts and halide/pseudohalide compounds. Additives that are electroactive or decomposed during electrodeposition/dissolution of the mirror metal, such as organic compounds normally used for leveling and brightening electrodeposits, should be avoided since they would limit the device cycle life.

Although the REM device of this invention can be fabricated using a liquid electrolyte, use of an electrolyte stiffener is preferred for many applications to minimize transport of detrimental atmospheric contaminants (e.g., oxygen) and prevent electrolyte loss that may affect mirror performance or create a chemical safety hazard, and to adhesively hold glass fragments formed during accidental breakage that could otherwise cause physical personal injury. Preferred electrolyte stiffeners are dispersed inorganic materials, e.g., highly dispersed silica (HDS) or alumina, which form thixotropic gels that can be liquefied by mechanical shearing for facile injection in REM cells, and typically have minimal effect on the electrolyte conductivity and REM performance. Such gels may in some cases have a beneficial effect on the REM mirror quality and/or cycle performance, and are relatively stable with temperature and adhere well to REM electrode materials.

For adjustable mirror applications, a coloring agent is preferably added to the REM electrolyte so that light reflection is minimized for the non-mirror state. A preferred coloring agent in this case is dispersed carbon black, which, in small amounts, provides high light absorption over a wide spectral range (that includes all visible light wavelengths), and tends to protect the electrolyte from degradation by ultraviolet light. The carbon black is preferably suspended by ultrasonic agitation and maintained in suspension by subsequent addition of an electrolyte stiffener.

The reversible electrochemical cells of this invention can be fabricated using spacers and a polymer sealant, or using a gasket or o-ring to provide both the proper spacing and a seal. The spacer and seal materials must be chemically compatible with the electrolyte. The preferred electrode separation is about 0.05–3.0 mm. Electrical contact is made to the metal buss on each electrode and connected to a voltage source for switching.

EXAMPLES

1. An adjustable reflectivity REM cell having a viewing area of approximately 2.5×3.5 cm was constructed using a mirror working electrode comprised of a 15 Å sputtered platinum nucleation layer on a 10-ohm/square ITO film on a glass substrate (5 cm square). The counter electrode was 60 Å sputtered Pt on 10 ohm/square ITO on a glass substrate (5 cm square), which had been electroplated with about 1 $\mu$m of silver from a commercial cyanide bath (Technisilver 2E, Technic Co.) and annealed at 200° C. for 30 minutes in an inert atmosphere (to improve adhesion) prior to cell assembly. A bare Pt/ITO border was left around the plated silver (via masking with plater's tape) to permit formation of a good seal with acrylic adhesive tape (VHB #4910, 3M Company), which also overlapped the plated silver to protect its edges. This acrylic tape (about 5 mm wide) served as both the cell spacer (1 mm) and primary sealant and was placed just inside the perimeter of glass panes so as to leave room for the 3-mm wide copper buss bars, attached to the Pt/ITO layer with conductive adhesive (C665, Furon Co.). The two panes of glass were offset by about 1 cm to provide better access for making electrical contact to the buss bars. Electrolyte preparation and cell final assembly were performed inside a nitrogen atmosphere glove box to avoid contamination with oxygen, which reacts electrochemically and can cause mirror self-erasure via chemical dissolution of the mirror metal. The electrolyte was injected through the acrylic tape using a pair of hypodermic needles (inlet and outlet) and a syringe. Epoxy was used to provide a second seal and to help hold the buss bars in place. The electrolyte contained 1.5 M AgI+2.0 M LiBr+63 mg/mL highly dispersed silica(M-5 Cab-O-Sil, Cabot Co.)+1.5 mg/mL carbon black (Vulcan, Cabot Co.) in high-purity GBL solvent (<20 ppm water). Addition of the highly dispersed silica produced a thixotropic gel that could be liquefied by stirring but became solid upon standing. This REM device exhibited excellent mirror quality (reflectance at 700 nm wavelength of 6.0% minimum, and 79.8% with a 400 Å silver deposit) and rapid switching (reflectance changes from 10 to 60% at −0.30 V in 7.0 s, and from 60 to 10% at +0.3 V in 6.3 s), and underwent 100,000 cycles at ±0.30 V between the maximum and minimum reflectance limits with no degradation in the mirror quality or switching speed. The switching current densities for this cell of about 3 mA/cm$^2$ at ±0.3 V are three times higher than the 1 mA/cm$^2$ reported in the prior art for a much higher cell voltage (1.0 V).

2. An adjustable reflectivity REM cell was constructed similar to that described in Example 1 except that 30 Å and 25 Å Pt layers were used for the mirror and counter electrodes, respectively, and the electrolyte was a liquid that contained no highly dispersed silica and no carbon black. Accurate reflectance measurements could not be made on this cell because of interference by light reflected from the counter electrode. Nonetheless, this REM device exhibited visually excellent mirror quality, rapid switching (comparable to that for the gelled electrolyte cell in Example 1), and no apparent degradation in mirror quality after more than 30,000 harsh cycles, involving plating at −0.5 V and continued application of the +0.4 V positive potential to the bare Pt/ITO mirror electrode surface for 10 seconds after mirror erasure. Based on experience with other REM cells, such harsh cycling corresponds to about an order of magnitude accelerated aging test, indicating that 300,000 normal cycles (between maximum and minimum reflectance values without sustained application of voltage to the bare Pt/ITO) would not degrade performance of this cell.

3. The general applicability of using a 2:1 molar ratio of halide/pseudohalide anions to attain dissolution of high concentrations of REM mirror metal cations in essentially nonaqueous solvents was demonstrated by dissolving more than 2 M silver halides in GBL, EG, DMSO and DMF electrolytes. In general, the Li$^+$, Na$^+$ and tetraalkylammonium (TAA) salts (e.g., TBAI, tetrabutylammonium iodide) were found to be most effective as sources of excess halide ions. For ethylene glycol, only iodide anions provided high silver ion solubility. Stable electrolytes containing 2.0 M or more of each of the following salt pairs were prepared: AgI/LiBr in GBL; AgI/NaI in EG; AgI/LiCl,AgI/NaI, AgBr/LiBrand AgBr/TBAI in DMSO; and AgBr/TBABr in DMF solvents.

FEATURES OF THE INVENTION

To attain the uniform metal deposition needed for mirror-like reflectivity, it is usually necessary to treat the transparent conducting film of the first electrode to improve nucleation, e.g., by vapor deposition/sputtering of a very thin, yet optically transparent (15 to 100 Å) "seed" layer of a metal (e.g., platinum or gold) that is electrochemically inert over the operating voltage range of the device. This nucleation layer enhances the uniformity of nucleation so that mirror deposits are obtained. Other surface treatments (e.g., electrodeposition of an inert metal layer) could be used to improve metal nucleation and provide mirror deposits. In order to be effective for producing mirror deposits, the nucleation layer must be microscopically continuous, which may not be the case for some metallization treatments on some transparent conductor substrates. For example, the two-step process commonly used to metallize printed wiring boards prior to copper plating (involving palladium displacement of adsorbed tin ions) may not produce sufficiently continuous films with adequate adhesion. For special effects, e.g., a decorative mirror design, the transparent conductor (e.g., ITO or FTO) and/or the metal nucleation layer can be patterned as desired.

The electrolyte of this invention employs an essentially nonaqueous solvent with a concentration of mirror metal cations greater than 0.5 M enabled by use of at least a 2:1 molar ratio of halide and/or pseudohalide anions to mirror metal cations. Excesses of the halide/pseudohalide anions are attained by addition of salts with cations that are not electroactive in the REM operating voltage range. Such high concentrations of mirror metal cations enable faster switching of REM devices by increasing the diffusion limited current for mirror metal deposition; poor quality deposits and short cycle life are obtained if the operating current approaches the diffusion limited current. As part of this invention, the ratio of halide/pseudohalide anions to mirror metal cations may be further adjusted to optimize the mirror quality and erasure, and device cycle life and current-voltage characteristics. This approach eliminates the need for other complexing agents or additives that may themselves be unstable during long-term cycling of the device. In some cases, however, it may be advantageous to use augmenting electrochemically stable additives that further inhibit the metal deposition process and improve the deposit properties by complexing the mirror metal ions or adsorbing on the electrode surface. Most of the organic addition agents used in the plating industry to brighten and level deposits, however, are electrochemically consumed during the metal deposition process and would be inappropriate.

No chemically reactive species are produced, since the same metal deposition/dissolution reaction occurs at both electrodes. As a result, a particular switched state is maintained indefinitely at open circuit if oxidizing contaminants (e.g., oxygen) are excluded from the cell.

The REM device of this invention is an electroreflective device (light reflection changed by application of voltage), rather than an electrochromic device (light absorption changed by applied voltage) as is typical of the devices taught in the prior art. REM devices can be designed to modulate reflectance and/or transmission of light.

The REM device is typically operated well within the electrolyte and electrode/nucleation layer stability regions, so that excessive metal plating or deplating is not inherently harmful. In fact, the REM device is always self-limiting for erasure of the mirror electrode when biased within the voltage stability region, since the current will practically cease when the deposited metal is depleted from that electrode. By limiting the amount of mirror metal deposited on the second electrode prior to cell assembly, overplating of the first electrode under a protracted applied voltage can also be precluded.

No cell separator is required, since the same redox couple reaction (metal deposition/dissolution) involving a solid product takes place at both electrodes, so that side reactions are avoided. On the other hand, a porous cell separator, e.g., porous polypropylene, may be used to provide a matrix for containing a liquid electrolyte and to prevent shorting of the two electrodes in the event of extreme flexure of the cell.

A wide temperature operating range is obtained by using electrolytes based on high boiling organic solvents, e.g., γ-butyrolactone, ethylene glycol, dimethylsulfoxide, etc. Use of mixtures of these solvents, and/or addition of water, can extend the temperature range to lower operating temperatures.

Use of a rigid electrolyte attained by incorporation of an electrochemically inert stiffening agent, either inorganic or organic, facilitates mirror fabrication, minimizes the possibility of chemical or physical personal injury, and reduces sensitivity to cell leakage and atmospheric contamination by preventing convectional transport.

Use of light-absorbing suspended particles or dissolved dyes in the electrolyte minimizes reflection from the counter electrode, which suppresses ghosting and lowers the minimum reflectance for adjustable mirror devices. Such electrolyte coloring can be used with any type of REM device for aesthetic purposes.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the fill scope of the invention.

We claim:

1. A reversible electrochemical mirror device for controlling the propagation of electromagnetic radiation, comprising:
    a first electrode;
    a second electrode, at least one of said first and second electrodes being substantially transparent to at least a portion of the spectrum of electromagnetic radiation;
    an electrolytic solution disposed between and in electrical contact with the first and second electrodes, said electrolytic solution comprising:
        an essentially nonaqueous solvent,
        cations of an electrodepositable mirror metal having a molar concentration greater than 0.5 M,
        a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1; and
    a plurality of atoms of said electrodepositable mirror metal disposed on at least one of said first and second electrodes;
    such that a negative electrical potential applied to the first electrode relative to the second electrode causes deposited metal to be dissolved from the second electrode into the solution and to be electrodeposited from the solution as a mirror deposit onto the first electrode, and
    such that a positive electrical potential applied to the first electrode relative to the second electrode causes deposited metal to be dissolved from the first electrode into the solution and electrodeposited from the solution onto the second electrode,
    the amount of deposited metal subsisting on the first electrode affecting the reflection of electromagnetic radiation by the device.

2. The device of claim 1, wherein said first electrode is substantially transparent to at least a portion of the spectrum of electromagnetic radiation.

3. The device of claim 2, further comprising a first substrate which is substantially transparent to at least a portion of the spectrum of electromagnetic radiation, the first electrode being disposed on the first substrate.

4. The device of claim 3, wherein the first electrode is an electrically conductive oxide coating deposited on the first substrate.

5. The device of claim 4, wherein the electrically conductive oxide coating is selected from the group consisting of aluminum zinc oxide, antimony tin oxide, fluorine tin oxide, indium oxide, indium tin oxide, fluorine indium oxide, aluminum tin oxide, phosphorus tin oxide, and indium zinc oxide.

6. The device of claim 3, wherein the first substrate is glass.

7. The device of claim 3, wherein the first substrate is plastic.

8. The device of claim 7, wherein the plastic is selected from the group consisting of acrylics, urethanes, polystyrenes, polycarbonates, styrene-acrylonitrile copolymers, styrene-butadiene copolymers, cellulosics, acrylonitrile-butadiene-styrene, polyvinylchloride, thermoplastic polyesters, polypropylene, nylons, polyester carbonates, ionomers, polyethyleneterephthate and cyclic olefin copolymers.

9. The device of claim 1, further comprising a surface modification layer disposed on the first electrode.

10. The device of claim 9, wherein said surface modification layer is a thin layer of metal that is electrochemically stable over the operating voltage range of the device.

11. The device of claim 10, wherein the electrochemically stable metal layer includes at least one metal selected from the group consisting of Pt, Ir, Au, Os, Pd, Re, Rh and Ru.

12. The device of claim 10, further comprising an underlayer between the first electrode and the surface modification layer to improve adhesion between the first electrode and the surface modification layer.

13. The device of claim 12, wherein the underlayer includes at least one metal selected from the group consisting of aluminum, chromium, hafnium, molybdenum, nickel, titanium, tungsten and zirconium.

14. The device of claim 1, wherein said second electrode is substantially transparent to at least a portion of the spectrum of electromagnetic radiation.

15. The device of claim 14, further comprising a second substrate which is substantially transparent to at least a portion of the spectrum of electromagnetic radiation, the second electrode being disposed on the second substrate.

16. The device of claim 15, wherein the second electrode is an electrically conductive oxide coating deposited on the second substrate.

17. The device of claim 16, wherein the electrically conductive oxide coating is selected from the group consisting of aluminum zinc oxide, antimony tin oxide, fluorine tin oxide, indium oxide, indium tin oxide, fluorine indium oxide, aluminum tin oxide, phosphorus tin oxide, and indium zinc oxide.

18. The device of claim 15, wherein the second substrate is glass.

19. The device of claim 15, wherein the second substrate is plastic.

20. The device of claim 19, wherein the plastic is selected from the group consisting of acrylics, urethanes, polystyrenes, polycarbonates, styrene-acrylonitrile copolymers, styrene-butadiene copolymers, cellulosics, acrylonitrile-butadiene-styrene, polyvinylchloride, thermoplastic polyesters, polypropylene, nylons, polyester carbonates, ionomers, polyethyleneterephthate and cyclic olefin copolymers.

21. The device of claim 14, wherein the second electrode is a locally distributed electrode.

22. The device of claim 1, further comprising a protective layer of metal, which is electrochemically stable over the operating voltage range of the device, disposed on the second electrode.

23. The device of claim 22, wherein the protective layer on the second electrode includes at least one metal selected from the group consisting of Pt, Ir, Au, Os, Pd, Re, Rh, Ru, Cr, Ni and Ti.

24. The device of claim 22, further comprising an underlayer between the protective layer and the electrode to improve adhesion between the protective layer and the second electrode.

25. The device of claim 24, wherein the underlayer includes at least one metal selected from the group consisting of aluminum, chromium, hafnium, molybdenum, nickel, titanium, tungsten and zirconium.

26. The device of claim 1, wherein the second electrode is a solid metal.

27. The device of claim 1, wherein the second electrode is a metal that is electrochemically stable over the operating voltage range of the device.

28. The device of claim 27, wherein the electrochemically stable metal of the second metallic electrode includes at least one metal selected from the group consisting of Pt, Ir, Au, Os, Pd, Re, Rh, Ru, Cr, Ni, Ti and stainless steel.

29. The device of claim 1, wherein the second electrode is a sheet of the electrodepositable mirror metal.

30. The device of claim 1, wherein the second electrode includes a roughened surface to reduce reflected radiation from the second electrode.

31. The device of claim 1, wherein the nonaqueous solvent includes at least one solvent selected from the group consisting of gamma-butyrolactone, ethylene glycol, dimethylsulfoxide, and dimethylformamide.

32. The device of claim 1, wherein said electrodepositable mirror metal is selected from the group consisting of silver, copper, bismuth, tin, cadmium, mercury, indium, lead, antimony, thallium and zinc.

33. The device of claim 1, wherein said halide compound is selected from the group consisting of chloride, bromide and iodide compounds.

34. The device of claim 1, wherein said pseudohalide compound is selected from the group consisting of cyanide and thiocyanate compounds.

35. The device of claim 1, wherein said halide or pseudohalide compound includes at least one cation selected from the group consisting of lithium, sodium, potassium, rubidium, cesium, magnesium, calcium, strontium, barium, organoammonium, and hydrogen ions.

36. The device of claim 1, wherein the electrolytic solution further comprises a stiffening agent that provides a viscous liquid, semi-solid or solid electrolyte.

37. The device of claim 36, wherein the stiffening agent is a finely dispersed metallic oxide.

38. The device of claim 37, wherein the metallic oxide is selected from the group consisting of silica, alumina and titania.

39. The device of claim 36, wherein the stiffening agent is a soluble polymer gelling agent.

40. The device of claim 39, wherein the soluble polymer gelling agent is selected from the group consisting of polyacrylamide, polyacrylic acid, polyacrylonitrile, polycarbonate resin, polymethylmethacrylate, polypropylenecarbonate, polyvinylalcohol, polystyrenes, polyvinylchloride, polyvinylidinefluoride and polyvinylpyrrolidone.

41. The device of claim 36, wherein the stiffening agent is a solid matrix that contains the electrolytic solution.

42. The device of claim 41, wherein the solid matrix is selected from the group consisting of finely divided electrically insulating powders, porous polymers, insulating sponges, insulating felts, and ormasils.

43. The device of claim 1, wherein the electrolytic solution further comprises a coloring agent.

44. The device of claim 43, wherein the coloring agent is dispersed carbon or other particulate material.

45. The device of claim 43, wherein the coloring agent is a dissolved organic or inorganic material.

46. The device of claim 1, wherein said solvent is ethylene glycol and wherein said electrolytic solution further comprises water added to suppress the freezing temperature of the electrolyte.

47. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second substrate;

a second electrode which is disposed on the second substrate;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

48. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second electrode;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

49. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second electrode;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1, an electrolyte stiffening agent; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

50. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second electrode;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1, an electrolyte stiffening agent, an electrolyte coloring agent; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

51. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second electrode;

an electrochemically stable metal layer deposited on the second electrode;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

52. A reversible electrochemical mirror device for controlling the propagation of electromagnetic radiation, comprising:

a first substrate which is substantially transparent to at least a portion of the spectrum of electromagnetic radiation;

a first electrode which is disposed on the first substrate and which is substantially transparent to at least said portion of the spectrum of electromagnetic radiation;

a surface modification layer disposed on the first electrode;

a second substrate which is substantially transparent to at least said portion of the spectrum of electromagnetic radiation;

a second electrode which is distributed in localized areas on the second substrate;

an electrolytic solution disposed between and in electrical contact with the first and second electrodes, said electrolytic solution comprising:

an essentially nonaqueous solvent, cations of an electrodepositable mirror metal having a molar concentration greater than 0.5 M, a halide or pseudohalide compound having cations that are not electroactive in the voltage range over which the device is operated, the ratio of the total molar concentration of halide and pseudohalide anions (where said total is the aggregate of anions originating from said halide or pseudohalide compound and anions originating from compounds of said electrodepositable mirror metal cations) to the total molar concentration of said electrodepositable mirror metal cations being at least 2:1; and a plurality of atoms of said electrodepositable mirror metal disposed on at least one of said first and second electrodes;

such that a negative electrical potential applied to the first electrode relative to the second electrode causes deposited metal to be dissolved from the second electrode into the solution and to be electrodeposited from the solution as a mirror deposit onto the first electrode, and such that a positive electrical potential applied to the first electrode relative to the second electrode causes deposited metal to be dissolved from the first electrode into the solution and electrodeposited from the solution onto the second electrode, the amount of deposited metal subsisting on the first electrode affecting the reflection of electromagnetic radiation by the device.

\* \* \* \* \*